(12) United States Patent
Santos et al.

(10) Patent No.: US 7,573,827 B2
(45) Date of Patent: Aug. 11, 2009

(54) METHOD AND APPARATUS FOR DETECTING NETWORK CONGESTION

(75) Inventors: Jose Renato Santos, San Jose, CA (US); Yoshio Turner, Redwood City, CA (US); Gopalakrishnan Janakiraman, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1092 days.

(21) Appl. No.: 10/430,668

(22) Filed: May 6, 2003

(65) Prior Publication Data

US 2004/0223452 A1 Nov. 11, 2004

(51) Int. Cl.
*G01R 31/08* (2006.01)
*H04L 12/28* (2006.01)
(52) U.S. Cl. .................. 370/242; 370/422
(58) Field of Classification Search .......... 370/227, 370/229–234, 235–237, 242, 422
See application file for complete search history.

(56) References Cited

U.S. PATENT DOCUMENTS

| 5,838,677 | A | * | 11/1998 | Kozaki et al. ............ 370/389 |
| 5,852,601 | A | * | 12/1998 | Newman et al. .......... 370/230 |
| 6,134,218 | A | * | 10/2000 | Holden .................... 370/232 |
| 6,144,636 | A | * | 11/2000 | Aimoto et al. ........... 370/229 |
| 6,424,624 | B1 | * | 7/2002 | Galand et al. ............ 370/231 |
| 6,463,062 | B1 | * | 10/2002 | Buyukkoc et al. ....... 370/395.1 |
| 6,856,595 | B1 | * | 2/2005 | Brown .................... 370/229 |
| 2001/0012269 | A1 | * | 8/2001 | Nakamura et al. ....... 370/230 |
| 2002/0167901 | A1 | * | 11/2002 | Brown et al. ............ 370/229 |
| 2002/0176363 | A1 | * | 11/2002 | Durinovic-Johri et al. .. 370/237 |
| 2004/0032827 | A1 | * | 2/2004 | Hill et al. ................ 370/229 |

* cited by examiner

*Primary Examiner*—Kevin C Harper
*Assistant Examiner*—Christine Duong (57) ABSTRACT

A method of detecting congestion in a communications network and a network switch are described. The method comprises identifying an output link of a network switch as a congested link on the basis of a packet in a queue of the network switch which is destined for the output link, where the output link has a predetermined state; and identifying a packet in a queue of the network switch as a packet generating congestion if the packet is destined for a congested link.

14 Claims, 8 Drawing Sheets

METHOD AND APPARATUS FOR DETECTING NETWORK CONGESTION

FIELD OF THE INVENTION

The present disclosure relates to a process for detecting congestion in a communications network, and a switch for executing the process.

BACKGROUND

Network congestion arises when traffic sent or injected into a communications network (i.e., the number of injected packets or bytes per unit of time) exceeds the capacity of the network. Congestion causes the throughput of useful traffic (i.e., traffic that reaches its destination) to be reduced because when the network is congested, packets hold onto network resources for longer times and/or network resources are consumed by packets that are later discarded.

Congestion control processes can be used to alleviate performance degradation during times of network congestion. Congestion control processes include:
 (i) a congestion detection process for detecting congestion in the network;
 (ii) a congestion notification process for signaling the congestion state of the network to appropriate nodes in the network; and
 (iii) a congestion response process for reacting to congestion, such that network performance is not degraded or is degraded to a lesser degree.

Processes to detect network congestion can be implemented in end nodes of the network and in switches internal to the network. Congestion detection processes executed by end nodes infer congestion based on network behavior attributes such as packet loss and round trip latency that can be observed from the end nodes. For example, the transmission control protocol (TCP) widely deployed in the Internet uses packet loss as an indication of congestion in the network, as described in V. Jacobson, "Congestion avoidance and control", *ACM SIGCOMM* 88, pp. 314-329, August 1988 ("Jacobson"). Other processes for congestion control in TCP infer congestion based on observations of network latency, including round-trip packet latency and variations in one-way packet latency, as respectively described in L. S. Brakmo and L. L. Peterson, "TCP Vegas: End to end congestion avoidance on a global internet," *IEEE Journal on Selected Areas in Communications*, Vol. 13, No. 8, pp. 1465-1480, October 1995, and C. Parsa, and J. J. Garcia-Luna-Aceves, "Improving TCP congestion control over Internets with heterogeneous transmission media," *Seventh International Conference on Network Protocols (ICNP'99)*, EEE Computer Society, pp. 213-221, October-November 1999.

Congestion detection processes executed by internal components of a network (such as routers and switches) infer congestion when internal network resources such as link bandwidth or network buffers are overloaded. For example, the DECbit congestion detection process detects congestion at a switch when the average size of the switch's output queues exceeds a predetermined threshold, as described in K. K. Ramakrishnan and S. Floyd, "A Proposal to add Explicit Congestion Notification (ECN) to IP," IETF RFC-2481, January, 1999 ("Ramakrishnan"). As described in S. Floyd and V. Jacobson, "Random Early Detection Gateways for Congestion Avoidance," *IEEE/ACM Transactions on Networking*, Vol. 1, No. 4, pp. 397-413, August 1993, the RED congestion detection process also uses the average output queue size to infer congestion, but uses two thresholds. Because congestion detection processes executed by network elements watch for particular events at individual network components, they are likely to be more precise in their information than processes executed by end nodes. Moreover, they allow congestion to be detected earlier, even before it manifests as lost packets or changed latencies at network end nodes.

When congestion is detected at internal network elements, a congestion notification process is executed to communicate the congestion state to other nodes in the network. These notification processes are referred to as Explicit Congestion Notification (ECN) processes, as described in Ramakrishnan. With Forward Explicit Congestion Notification (FECN), congestion detected at a network switch element is signaled to the destination nodes of the packets involved in the congestion. The destination nodes can, subsequently, propagate this information to the respective source nodes. Signaling of the destination node as well as the subsequent signaling of the source node can occur in-band using congestion marker bits in the network packets themselves or can occur out-of-band using congestion control packets dedicated to carrying congestion information. The DECbit and RED processes modify ECN bits in packet headers to notify (in-band) the destination nodes of congestion. Network switch elements can also communicate congestion information to source nodes directly without communicating it through the destination node. With this Backward Explicit Congestion Notification (BECN) approach, the switch creates and transmits a congestion control packet carrying congestion information back to the source node.

Congestion response processes determine how traffic injection is adjusted in response to changes in the congestion state of the network. Response processes are typically executed by end nodes of the network (e.g., TCP); however, in some cases (e.g., ATM), these can be executed by network switches. These response processes can control traffic injection in two ways. One method is to limit the number of packets that can be concurrently 'in flight' in the network between a pair of communicating source and destination nodes. This window control technique uses acknowledgment messages from the destination to the source to indicate which messages have been received (i.e., which messages are no longer in flight). A second method is to control the rate at which packets are injected (or, equivalently, the time interval between packets) into the network. Unlike window control, the rate control technique does not necessitate acknowledgment messages from the destination. Both these techniques have been widely used. Congestion control in TCP, as described in Jacobson, is a well-known example of window control, and traffic management in ATM is a well-known example of rate control. In either case, congestion response processes limit traffic injection when congestion is detected and increase traffic injection when congestion is not detected for a length of time. Policies that determine the adjustments to the traffic injection window or rate, as described in D. Chiu and R. Jain, "Analysis of the increase and decrease algorithms for congestion avoidance in computer networks," *Computer Networks and ISDN Systems*, 17(1), June 1989, pp. 1-14, are an important design parameter. In addition to controlling congestion, these policies are designed to support high throughput, fairness among competing network flows, fast response to congestion and low oscillations in network behavior.

A number of attributes of network architecture influence the design of network congestion control processes. One of these is the manner in which the network is designed to handle packets when buffer space is not available to buffer them at a switch. Many networks, such as Ethernet networks, permit network switches to drop incoming packets if space is not available to buffer them. In this scenario, packet losses are available as hints to detect network congestion. Many other networks, such as Infiniband, as described in "Infiniband Architecture Specification Release 1.0.a," are designed to avoid packet dropping due to buffer overruns. These networks incorporate a link level flow control process which blocks a switch to prevent it from transmitting a packet over a link if the downstream switch at the other end of the link does not have sufficient buffering to receive the packet. Link level flow control is typically implemented using a credit based method in which receiver logic at one end of the link periodically sends control packets granting credits to transmitter logic on the other end of the link. The transmitter can send as many packets as are permitted by these credits and blocks when it has exhausted its credits. The transmitter remains blocked until it receives more credits. In networks with link level flow control, packets are not discarded by the network (except under error conditions such as failure of a switch or link). Hence packet losses are not available as hints to detect congestion in such networks.

Figure 1:
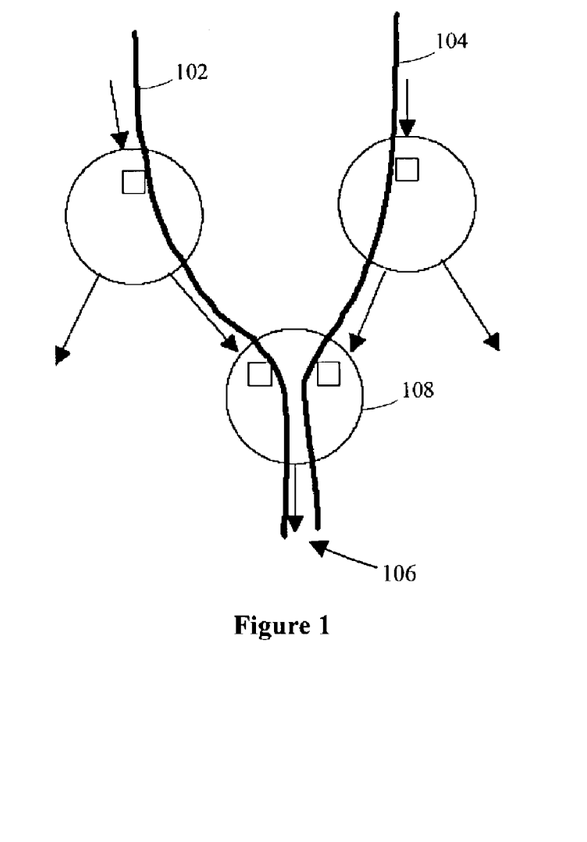
FIG. 1 is a schematic diagram of a network link supporting two flows, which can become congested in accordance with embodiments of the invention.

Congestion occurs when the demand for a network resource (such as a link) exceeds the capacity of the network resource. For example, two flows 102, 104 can share a single bottleneck link 106, as shown in FIG. 1. If the two flows 102, 104 provide sufficiently heavy loads, the bottleneck link 106 will not be able to simultaneously accommodate all the traffic from both flows 102, 104. In all networks, this congestion will first manifest as an increased number of packets buffered in the switch 108 at the congested link, soon growing to the extent that no additional packets destined for the congested link 106 can be buffered at that switch 108. The subsequent development of the congestion depends on the manner in which the network is designed to handle packets when buffer space is not available to buffer them at a switch.

If the network permits switches to drop incoming packets upon congestion, some packets that would otherwise traverse the congested link 106 will be discarded as long as congestion persists. Buffers for the congested link 106 will remain fully occupied and the network's useful packet throughput will drop. However, because the congested switch 108 does not block upstream switches from transmitting packets, buffers in upstream switches will continue to drain. This allows packets that are not traversing the congested link 106 to flow through the network with little, if any, additional delay or loss in throughput.

Figure 2:
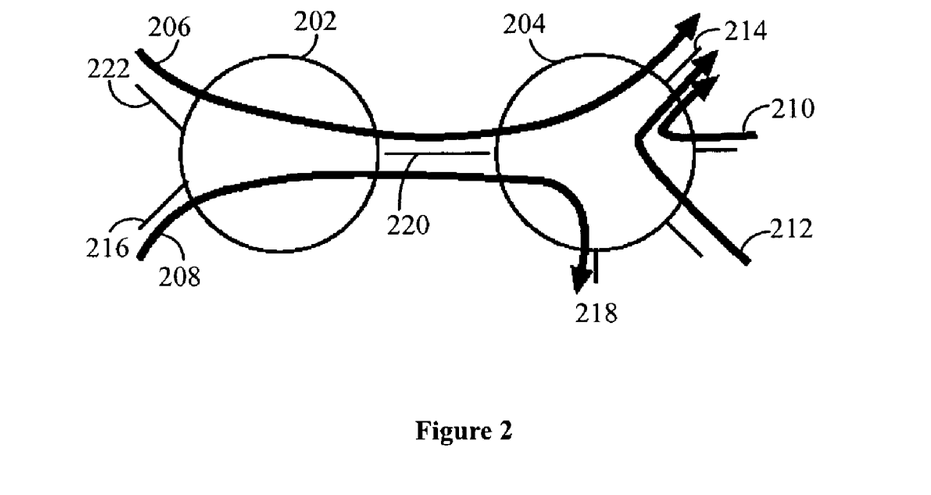
FIG. 2 is a schematic diagram of two network switches joined by a single link, used to illustrate congestion spreading in accordance with embodiments of the invention.

In networks with link level flow control, packets are not dropped. However, congestion can lead to an undesirable effect known as congestion spreading or tree saturation. When a switch buffer fills up due to congestion, it blocks the buffer's upstream node. This blocking can spread further upstream until buffers fill all the way back to the source nodes of the affected traffic flows. The particular disadvantage of congestion spreading is that it affects flows that do not exert any load on the oversubscribed link resource. For example, consider the scenario shown in FIG. 2 with two switches 202, 204, each with buffering at its input ports, and four traffic flows, 206 to 212, each of which injects packets as rapidly as possible. Three traffic flows 206, 210, and 212 are all directed to a first destination link 214, and a fourth flow 208 is directed from a source link 216 to a second destination link 218. The fourth flow 208 shares an inter-switch link 220 with the first flow 206. Ideally, the sum of the throughputs of the first 206 and fourth 208 flows should equal the capacity of the inter-switch link 220. However, if the first destination link 214 is oversubscribed, then the input buffers at the switches 202, 204 become full with packets. In particular, the input buffer at the inter-switch link 220 of the right switch 204 will fill with packets and block flow on the inter-switch link 220. Therefore, the inter-switch link 220 goes idle, wasting bandwidth that could be used for transmitting packets from the second source link 216 to the second destination link 218 by the fourth flow 208. Assuming a fair switch scheduling process, each of the three flows 206, 210, 212 directed to the first destination link 214 uses approximately one third of the bandwidth of the bottleneck or first destination link 214. Assuming further a fair switch scheduling policy, the left switch 202 will alternate packets from the first flow 206 and the fourth flow 208 when scheduling packets on the inter-switch link 220. Therefore, the fourth flow 208 will be transmitted at the same rate as the first flow 206, i.e., assuming equal bandwidth for the inter-switch link 220 and the bottleneck link 214, the fourth flow 208 and the first flow 206 will consume one third of the inter-switch link bandwidth. Therefore one third of the inter-switch link bandwidth which could be used to send packets from the fourth flow 208 is wasted. If the upstream source node on the source link 222 of the first flow 206 was informed that it could not transmit at the full link bandwidth and reduced its rate to the rate determined by the bottleneck link 220, i.e., one third of the link bandwidth in this example, the buffers at the switch 204 would not fill up, and the bandwidth at the inter-switch link 220 could be more efficiently utilized by the fourth flow 208.

Effective network congestion control requires an effective congestion detection process. Congestion detection processes in network switches can infer congestion by detecting oversubscription of link and/or buffer resources. However, these processes should be capable of distinguishing oversubscription due to persistent congestion from transient oversubscription due to bursty behavior in network traffic. It is also desirable for the congestion detection process to be applicable to networks that drop packets when buffers fill up as well as networks that implement a link level flow control process to avoid packet losses. The congestion detection process should also be compatible with switch architectures that differ in their buffering organization (e.g., whether they use buffers at their input ports or their output ports etc.).

The ATM forum has proposed congestion control for its ABR service class by executing a congestion detection process in switches. Switches monitor the current number of connections routed through the switch as well as the traffic generated by these connections. The switch determines the distribution of the available bandwidth among all the active connections and sends control packets to end nodes, informing them of the rate at which packets should be generated. The main disadvantage of this process is that switches maintain state information for each connection to manage traffic on a per-connection basis. This increases switch complexity and limits the ability to scale to large networks with a large number of connections.

Congestion detection processes used in the DECbit and RED processes are simpler and more scalable because they do not require the maintenance of per-connection state. The DECbit process detects congestion by comparing the average size of switch output queues to a predefined threshold. The average queue size is periodically computed and congestion is reported (through an ECN process) when the average queue size exceeds the threshold. The RED process is similar, but uses two thresholds. When the average queue size exceeds the first threshold, the ECN bits of packets in the queue are randomly set with a given probability, and when the second threshold is reached, the ECN bits of all packets in the queue are set.

These and other previously proposed processes for congestion detection in network switches have been directed at networks that permit packets to be dropped if buffer space is unavailable. Because high (or complete) buffer utilization is limited to the congested switch in such networks, these processes are likely to identify the congestion point reasonably accurately. However, in networks that employ link level flow control (such as Infiniband), congestion spreading can result in full buffers in switches other than the congested switch as well. In this environment network flows that are causing congestion spreading should be distinguished from flows that are suffering congestion spreading.

BRIEF DESCRIPTION OF THE DRAWINGS

Preferred embodiments of the present invention are hereinafter described, by way of example only, with reference to the accompanying drawings, wherein.

DETAILED DESCRIPTION OF THE PREFERRED EMBODIMENTS

Figure 3:
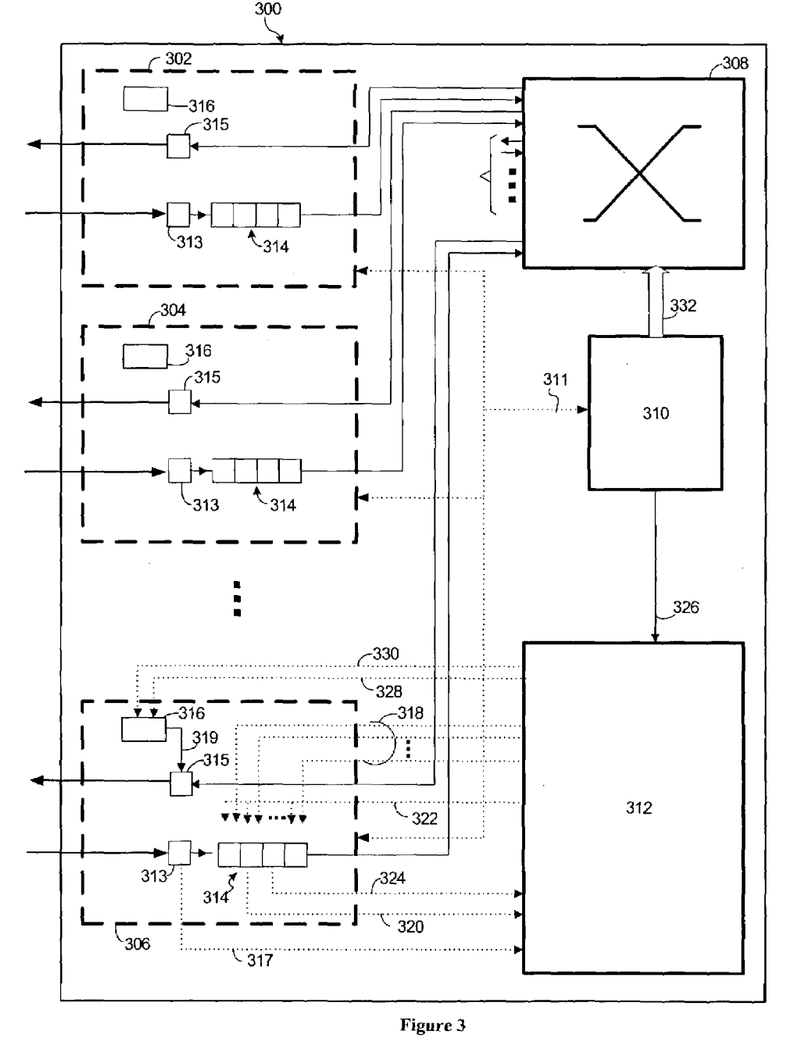
FIG. 3 is a block diagram of an embodiment of a network switch.

A network switch 300, as shown in FIG. 3, executes a congestion detection process that detects congestion on one or more links connected to respective ports of the switch 300, in a network with link level flow control. The switch 300 is an input buffered network switch with N bidirectional ports 302, 304, ..., 306. The switch 300 includes components standard to an input-buffered network packet switch, such as an ATM switch including a cross-connect or crossbar module 308, a switching logic module 310, and for each of the N ports 302 to 306, an input interface 313, a first-in-first-out (FIFO) input queue buffer $Q_{in}$, 314 that can hold multiple packets, and an output interface 315. These components are adjusted or configured, to implement the congestion process, as described below. The switching logic module 310 uses port status and control lines 311 to monitor and control the ports 302 to 306 and a crossbar bus 332 to control the switch matrix or crossbar 308. To implement the congestion detection process, the switch 300 also includes a congestion root indication (CRI) bit memory 316 at each of its ports, a packet marking logic module 312, and a temporary mark bit $m_{temp}$ for each packet is stored in an input buffer 314 in the switch 300. In each of the ports 302 to 306, the port's output interface 315 accesses the port's CRI bit memory 316 over connection 319. The packet marking logic module 312 connects to the switching logic module 310 with link state connections 326 over which it receives link credit state data for each output link in the switch 300, indicating whether the link is blocked. The packet marking logic module 312 also connects to each of the N ports 302 to 306 through several connections: a new packet signal connection 317 from the input interface 313, temporary mark signal connections 318 that can be used to individually set or clear the $m_{temp}$ temporary mark bits in the buffer slots 314, a full buffer indication signal connection 320 from the input buffer $Q_{in}$ 314, a propagation mark signal connection 322 that is used to set a field in the header of a packet in the input buffer 314, indicating it is propagating congestion, packet destination connections 324 over which the destination of any packet in the buffer 314 can be determined, a CRI set connection 328 and a CRI reset connection 330. Connections between the packet marking logic module 312 and components of the $N^{th}$ port 306 are shown in FIG. 3. Connections between the packet marking logic module 312 and the other ports 302, 304 have been omitted from FIG. 3 for clarity.

As in any standard switch, the switch 300 receives and transmits network packets over N network links via the N ports 302 to 306. The switch 300 routes a network packet received on an $i^{th}$ port and transmits the packet on the $j^{th}$ port on the basis of an address within the packet and a set of routing rules stored in the switching logic module 310.

In addition to standard packet switching functions, the switch 300 also executes the congestion detection process. The congestion detection process identifies one or more data packets contributing to congestion spreading. Once these packets are identified, they are marked to notify the end (i.e., source) nodes sending the packets so that those nodes can control their data injection rate accordingly. The congestion detection process is implemented using software of the packet marking logic module 312 to read and write data associated with data packets. However, it will be apparent to those skilled in the art that at least parts of the congestion detection process can be alternatively implemented using dedicated hardware components, such as application-specific integrated circuits (ASICs), included as part of the switch 300.

Congestion spreading originates at a link for which the traffic demand exceeds the link's capacity. In networks with link level flow control, this congestion can spread to neighboring switches and be propagated over several hops, creating a congestion tree that originates at the overloaded link. This overloaded link is referred to as the root link of the congestion spreading tree, or simply the root link.

Two types of packets contribute to congestion spreading:
(i) Generating Packets that are transmitted in the root of the congestion tree. These packets are responsible for generating congestion; and
(ii) Propagating Packets that are queued in a full input queue. These packets are contributing to the propagation of the congestion tree to neighbor switches. A packet can be both generating congestion and propagating a congestion tree.

The congestion detection process identifies and marks packets that are generating congestion as well as packets that are propagating congestion. Each data packet received and transmitted by the switch 300 includes a header with two bits of congestion data: one bit propagating($pckt_i$) indicating whether the packet is propagating congestion, and the other bit generating($pckt_i$) indicating whether the packet is generating congestion. Packets generating congestion are identified and marked because their traffic exceeds the root link's capacity. Packets propagating congestion are marked to contain the spreading of congestion when it starts. This reduces the size of the congestion tree and the number of flows impacted by congestion spreading. Alternatively, these two bits of information can be combined into a single bit if it is not necessary to distinguish between packets propagating congestion and packets generating congestion (e.g., if the congestion response process reacts identically in either case).

The congestion detection process for identifying and marking packets generating and propagating congestion can be broadly summarized as follows:

(i) The detection of congestion spreading at the switch 300 is triggered when an input queue becomes full.
   A full queue indicates that congestion spreading is occurring, and packets in the full queue are identified as packets propagating the congestion.
(ii) An output link at the switch 300 is identified as the root of a congestion tree when at least one packet in a full input queue at the switch 300 is destined for the output link and the output link is not blocked (i.e., it has credits for sending data packets).

If the output link is blocked (i.e., it does not have credits for sending data packets), the input buffer in the next downstream switch is full, indicating that the root of the congestion spreading tree is somewhere downstream. In this case, packets generating the congestion tree are identified at a downstream switch with the root link and not at the current switch 300. If an output link identified as the root link runs out of credits and blocks at a later time, the decision is revoked and the output link is no longer considered a root link. (iii) All data packets enqueued at the switch 300 (at any of its input buffers 314) and destined for the root output link at the instant when an input queue becomes full and the output link is identified as a root are identified as packets generating congestion. The switch 300 performs a scan of its input buffers 314 to identify packets generating congestion once a root link has been identified. As above, if the output link runs out of credits at a future time, it ceases to be a root link and packets destined for this output link are no longer considered packets generating congestion.

Figure 4:
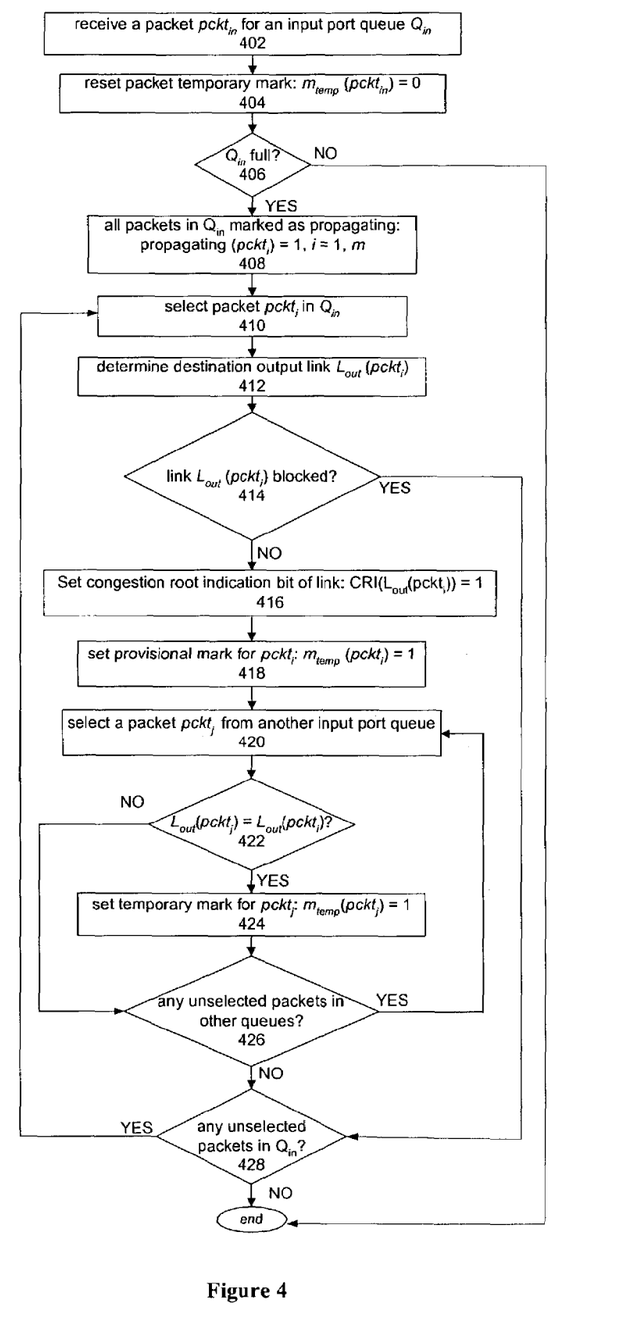
FIGS. 4 to 6 are flow diagrams of a congestion detection process executed by the switch in accordance with embodiments of the invention.

The congestion detection process can be considered in some embodiments to include three sub-processes, each being initiated by the occurrence of a particular event at the switch 300. Most of the steps of the congestion detection process are included in a first sub-process that is initiated when a data packet arrives on one of the ports 302 to 306 of the switch 300. As shown in FIG. 4, the first sub-process begins at step 402 when the last byte of the header of a packet $pckt_{in}$ is received on the input interface 313 associated with an input port queue $Q_{in}$ 314. For convenience, the description below refers to components of the $N^{th}$ port 306 shown in detail in FIG. 3. However, the description applies equally to any one of the N ports 302 to 306 of the switch 300.

When a new packet arrives, it is added to the input queue $Q_{in}$ 314 and a new packet signal is sent from the input interface 313 to the packet marking logic 312 on new packet signal connection 317. This triggers the packet marking sub-process. At step 404, the temporary mark bit for the packet is reset, i.e., the bit is cleared, or $m_{temp}(pckt_{in})=0$. At step 406, a test is performed to determine whether the queue $Q_{in}$ is full, using the full buffer indication signal connection 320. If not, then the first sub-process ends. Otherwise, if the input queue is full, this indicates that congestion spreading is occurring, and at step 408 all packets in the queue 314 are marked as propagating the congestion spreading tree; i.e., the packets' congestion propagation bits are set: $propagating(pckt_i)=1$, i=1, m, where m represents the number of queue entries. This is achieved by sending a set propagation mark signal to all queue entries in parallel on the propagation mark signal connection 322.

To identify any output links that may be roots of congestion trees, each output link that is the destination for at least one packet in the full input queue $Q_{in}$ is examined to determine whether it is blocked. Starting at one end of the queue $Q_{in}$ 314, a packet $pckt_i$ in the queue $Q_{in}$ 314 is selected at step 410, and at step 412, the destination output link for the packet, $L_{out}$ ($pckt_i$), is determined via packet destination connections 324. If, at step 414, it is determined that the link $L_{out}(pckt_i)$ for that packet is blocked (i.e., the link has no credits for sending, as determined from link credit state data sent to the packet marking logic module 312 from the switching logic module 310 over link state connections 326), then the process loops back to step 410 to select the next packet in the queue $Q_{in}$ 314. Otherwise, if the output link is not blocked, it is considered to be the root of a congestion tree. Thus at step 416 the output link is marked as root by setting its congestion root indication bit: $CRI(L_{out}(pckt_i))=1$. This is achieved by sending a CRI set signal to the CRI bit memory 316 over the CRI set connection 328 of the port for that link.

Figure 5:
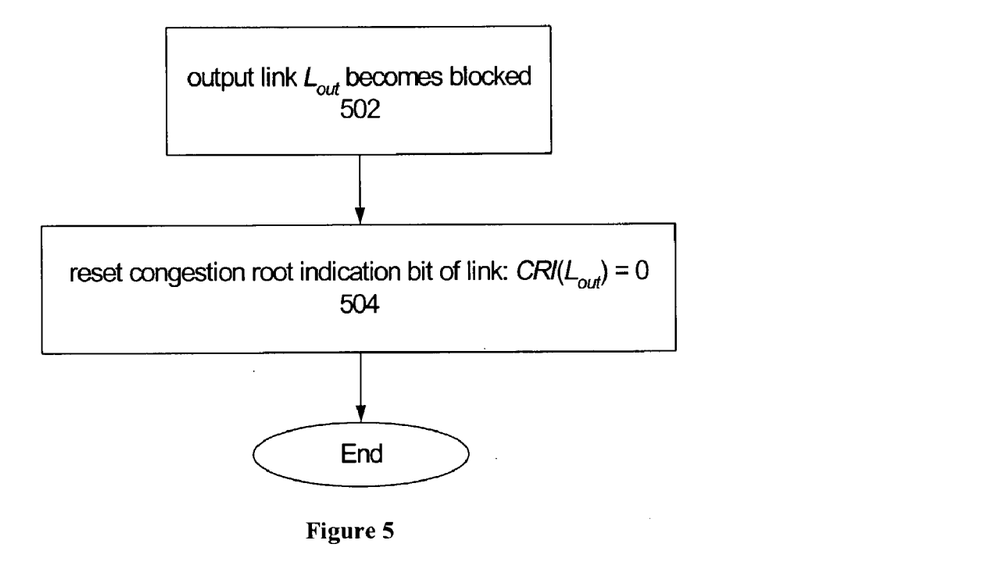

All packets currently in the switch 300 and which are destined to this output link $L_{out}(pckt_i)$ are then temporarily marked as packets generating congestion. Thus at step 418 the temporary mark for the packet $pckt_i$ is set: $m_{temp}(pckt_i)=1$, and at steps 420 to 426, the packets $pckt_j$ in the input queues of all other ports 302 to 306 in the switch 300 are inspected and, if destined to $L_{out}(pckt_i)$, the temporary mark for the packet $pckt_j$ is set: $m_{temp}(pckt_j)=1$. The packets are only temporarily marked because they will not subsequently be classified as packets generating congestion if the output link $L_{out}(pckt_i)$ becomes blocked before the packet is transmitted. As shown in FIG. 5, this situation is handled by a second sub-process that is invoked when an output link becomes blocked at step 502. If this happens, the CRI bit for the blocked link is reset at step 504 to indicate that it is not a congestion root; i.e., $CRI(L_{out})=0$. This is achieved by sending a CRI reset signal to the CRI bit memory 316 over the CRI reset connection 330 of the corresponding port.

Figure 6:
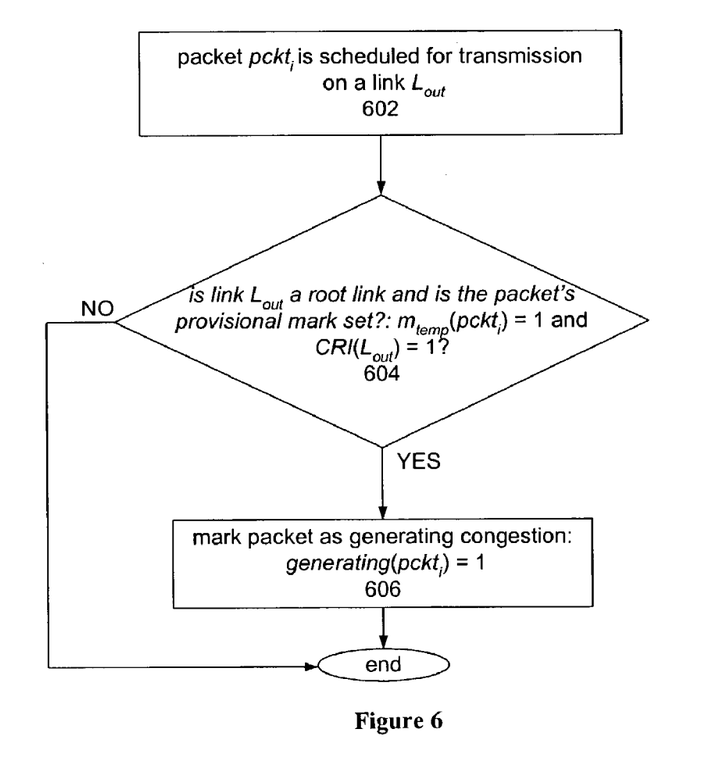

As shown in FIG. 6, a third sub-process is invoked at step 602 when a packet $pckt_i$ is scheduled for transmission on a link $L_{out}$ over the corresponding output interface 315. If the temporary congestion mark $m_{temp}(pckt_i)$ for the scheduled packet is set, then the packet is marked as a packet generating congestion if the output link is still considered root at the time of the packet transmission. Thus, at step 604, the link's congestion indication bit $CRI(L_{out})$ and the temporary mark for the packet $m_{temp}(pckt_i)$ are inspected. If both are set, then the packet is marked at step 606 as generating congestion, i.e., the generating congestion bit of the packet header is set to 1: $generating(pckt_i)=1$.

It will be apparent that a packet marked as propagating congestion may or may not also be marked as a packet generating congestion, and vice versa, because:

(i) a packet is marked as propagating congestion if it is occupying space in a full input queue; whereas
(ii) a packet is marked as generating congestion if it is destined for an unblocked output link to which at least one packet in a full input queue is also destined, and the link is still unblocked at the time the packet is sent.

Figure 7:
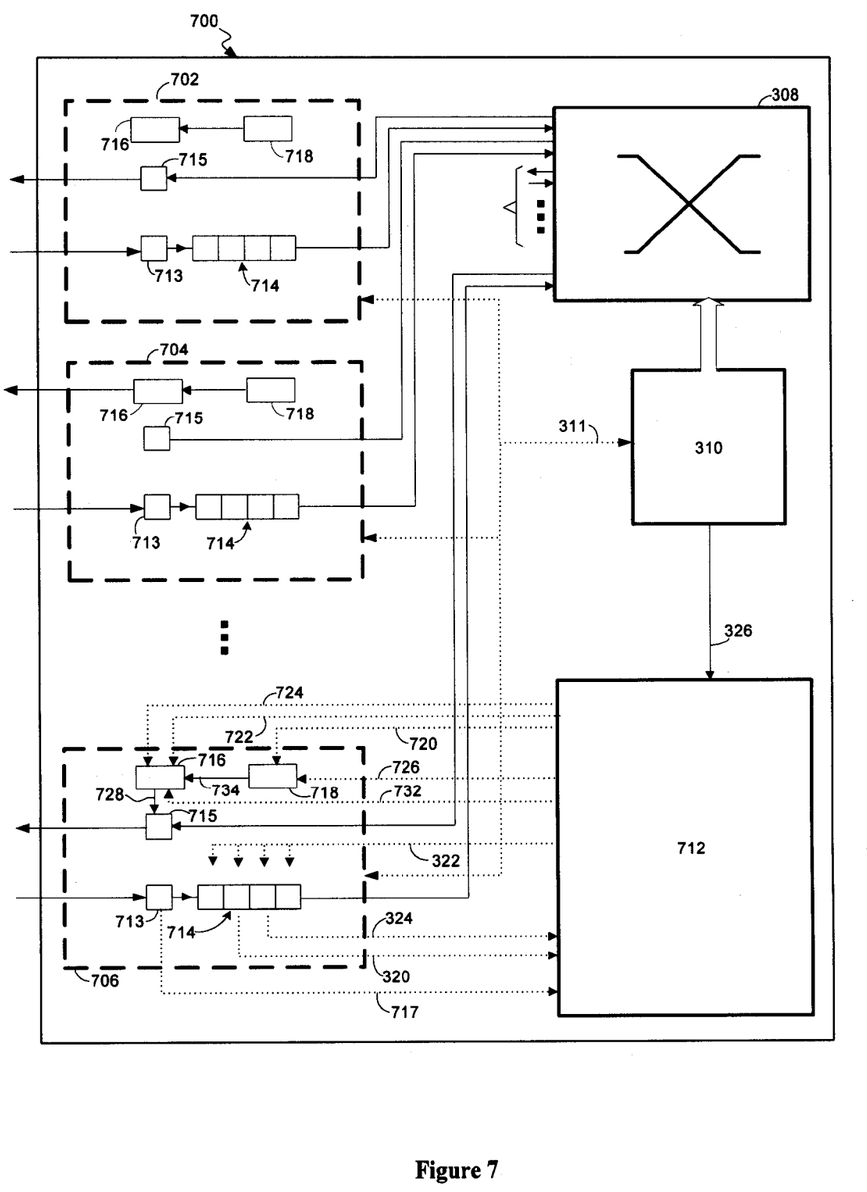
FIG. 7 is a block diagram of a second embodiment of a network switch.

A second network switch 700, as shown in FIG. 7, is the same as the first switch 300, except:

(i) each of the N bidirectional ports 702 to 706 includes an input interface 713, a FIFO input queue buffer 714, and an output interface 715, which have slightly different connections than their counterparts in the first switch 300,
(ii) the new packet signal connection 717 replaces connection 317 and also carries the header of a new packet;

(iii) the N bi-directional ports 702 to 706 do not include CRI bit memory 316 or $m_{temp}$ temporary mark bit storage, but they each include a mark module 716 and a count module 718;

(iv) the mark module 716 can access the value in the count module 718 over a connection 734;

(v) the mark module 716 can provide its value to the output interface 715 over a connection 728;

(vi) the packet marking logic module 712 connects to each of the N ports 702 to 706 through several connections, (not including connections 318, 328, and 330), including a mark reset connection 724 which clears the mark module 716, a mark load connection 722 which loads the mark module 716 with the value in the count module 718, a mark decrement connection 732 which decrements the value in the mark module 716, a count increment connection 720 which increments the value in count module 718, and a count decrement connection 726 which decrements the value in count module 718; and (vii) the packet marking logic module 712 executes a second congestion detection process.

The second congestion detection process may also detects congestion on one or more packet flows passing through the switch 700, in a network with link level flow control. However, whereas the first switch 300 scans all packets in all other queues in order to determine whether to set their provisional marks $m_{temp}$ every time an input queue becomes full, the second congestion detection process avoids the cost of scanning any switch buffer other than the full buffer that triggered the congestion detection process. This is accomplished by maintaining a running count of the number of packets in the second switch 700 that are destined for each output link. This count can be incrementally accumulated with low overhead by incrementing and decrementing a counter (for each output link) as packets enter and leave the switch 700. When an output link is determined to be a root link, the count associated with this link identifies the number of packets enqueued for that link in the switch 700 that are to be marked as packets generating congestion.

The second switch 700 may uses state variables represented as integer arrays, each element of which is associated with one output link of the switch. The size of the arrays is defined by the number of output links N. These arrays are:

Count[i: 1 to N]: This is a counter array which indicates the total number of packets in the switch 700 destined to each output link Mark[i: 1 to N]: This is a counter array which indicates how many of the next packets to be transmitted on each output link should be marked.

Each element of the Count[ ] array is stored in and modified by the count module 718 of the corresponding port, and each element of the Mark[ ] array is likewise stored in and modified by the mark module 716 of the corresponding port.

Figure 8:
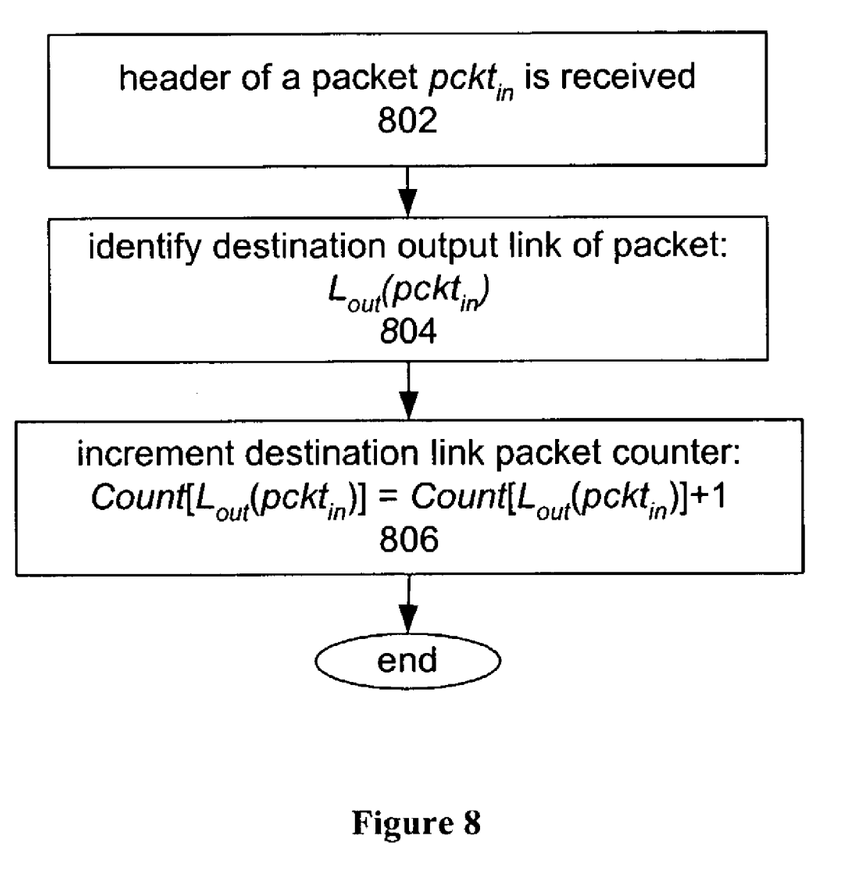
FIGS. 8 to 11 are flow diagrams of a congestion detection process that may be executed by the switch of the second preferred embodiment.

The second congestion detection process can in some embodiments be considered to include four sub-processes, each being initiated by the occurrence of a particular event at the switch 700. As shown in FIG. 8, a first sub-process begins at step 802 when the packet header of a packet $pckt_{in}$ is received by the input interface 313. The destination of the corresponding packet is sent to the packet marking logic module 712 over the new packet signal connection 717, and receipt of this signal triggers execution of the first sub-process in the packet marking logic module 712. The packet is then added to the input queue 714. At step 804, the packet destination output link $L_{out}(pckt_{in})$ is identified. At step 806, the packet counter for the identified destination link is incremented: $Count[L_{out}(pckt_{in})]=Count[L_{out}(pckt_{in})]+1$. This is achieved by sending a signal over the count increment signal connection 720. This ends the first sub-process.

Figure 9:
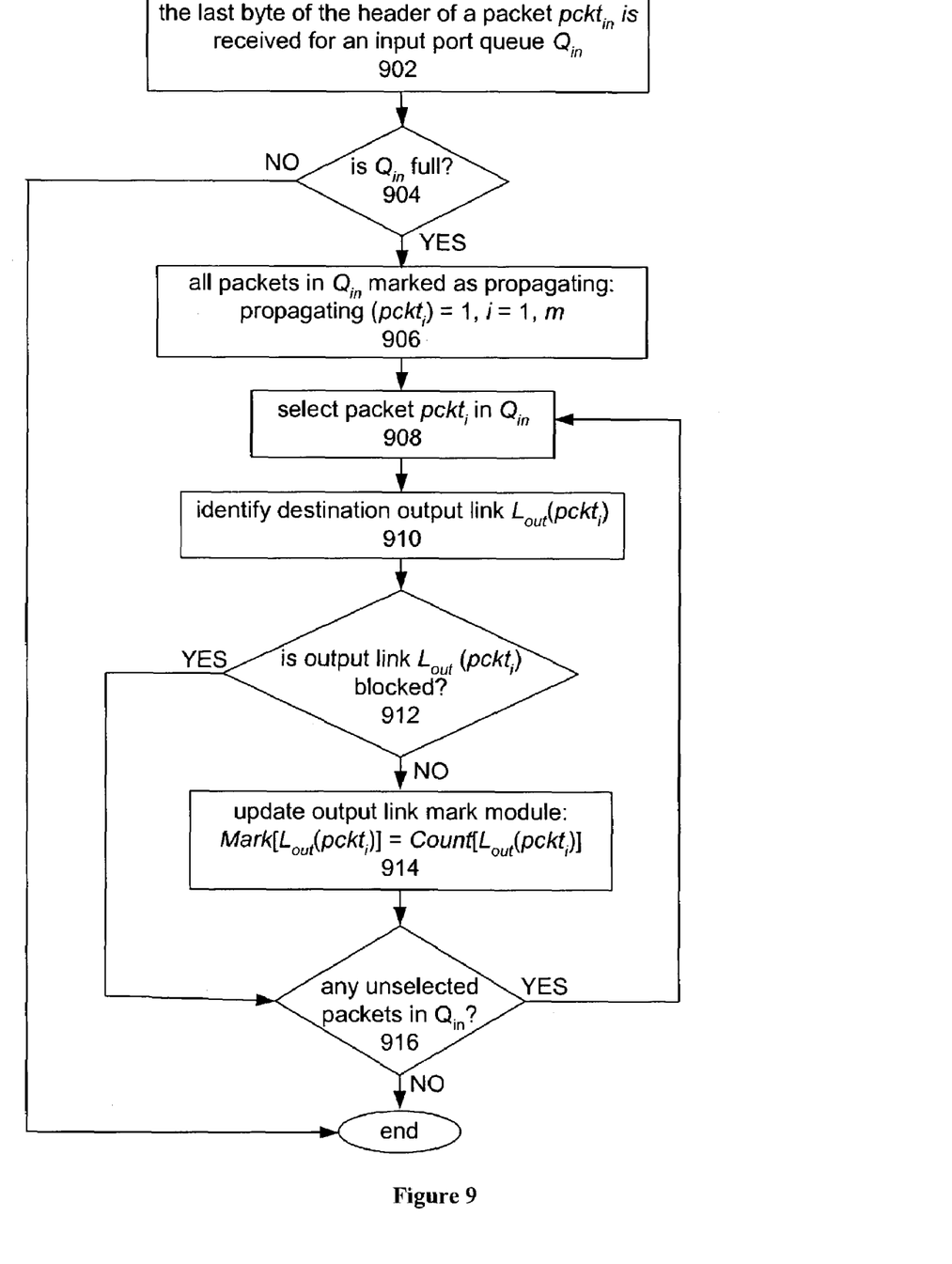

As shown in FIG. 9, a second sub-process begins at step 902 when the last byte of the header of a packet $pckt_{in}$ is received on the input port queue $Q_{in}$ 714, as indicated over the full buffer signal connection 320 to the packet marking logic module 712. If, at step 904, the input queue $Q_{in}$ 714 is determined not to be full, then the second sub-process ends. Otherwise, at step 906 all packets in the queue 714 are marked as propagating congestion; that is, the propagating congestion bit in each packet header is set by sending a signal on the propagation mark signal connection 322: propagating $(pckt_i)=1, i=1,m$. At step 908, a packet $pckt_i$ in $Q_{in}$ is selected. At step 910, the destination output link of the packet $L_{out}(pckt_i)$ is determined via packet destination connections 324. If, at step 912, the output link $L_{out}(pckt_i)$ is determined to be blocked, then the next packet in the queue $Q_{in}$ 714 is selected. Otherwise, the mark module 716 of port $L_{out}(pckt_i)$ is updated at step 914: $Mark[L_{out}(pckt_i)]=Count[L_{out}(pckt_i)]$. This is achieved by sending a load signal to the mark module 716 over the mark load connection 722, which causes the value stored in the count module 718 of the port to be loaded into the mark module 716. At step 916, if the end of the input queue 714 has not been reached, the sub-process loops back to select the next packet in the input queue 714 at step 908. Otherwise, the second sub-process ends.

Figure 10:
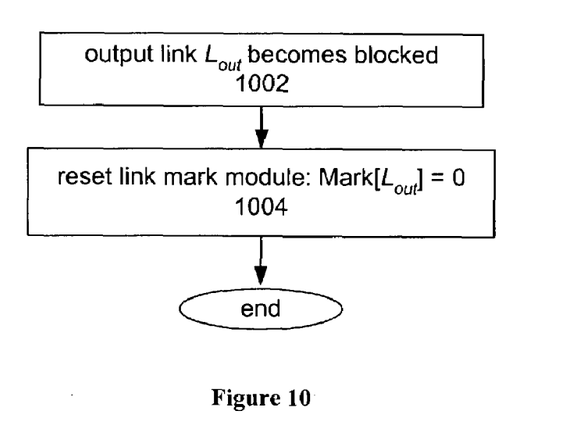

As shown in FIG. 10, a third sub-process begins at step 1002 when an output link $L_{out}$ becomes blocked, as indicated by link credit state data sent from the switching logic module 310 to the packet marking logic module 712 via the link credit state connection 326. At step 1004, the mark counter for the blocked link is reset, i.e., $Mark[L_{out}]=0$, by sending a mark reset signal to the mark module 716 via the mark reset connection 724. This completes the third sub-process.

Figure 11:
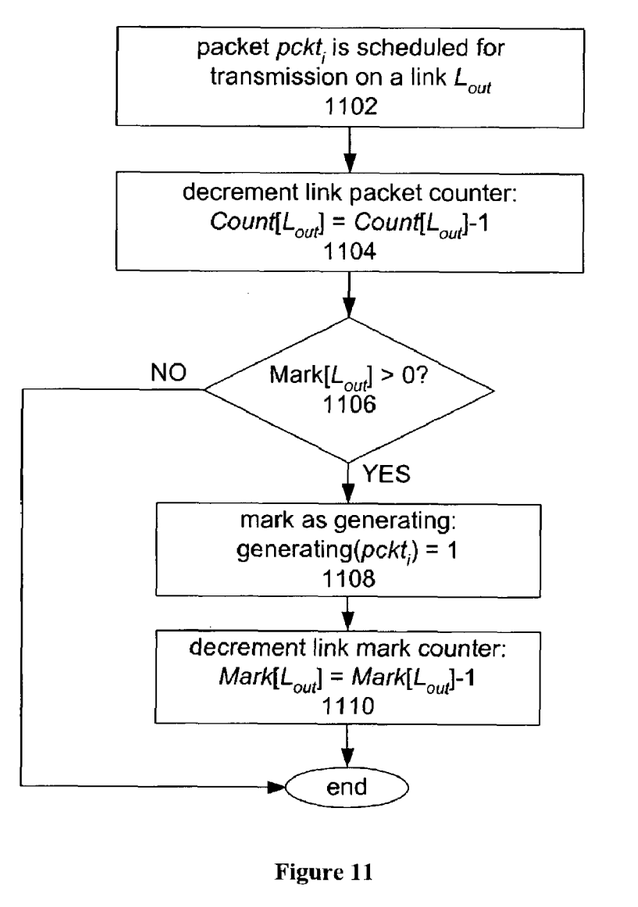

As shown in FIG. 11, a fourth sub-process begins at step 1102 when a packet $pckt_i$ is scheduled for transmission on a link $L_{out}$ over the output interface 715. At step 1104, the link packet counter is decremented, i.e., $Count[L_{out}]=Count[L_{out}]-1$, by sending a count decrement signal from the packet output module 715 to the count module 718 via count decrement connection 726. If, at step 1106, the value in mark module 716 is greater than zero, $Mark[L_{out}]>0$, then the packet is marked as generating congestion at step 1108: generating$(pckt_i)=1$, and the value in the mark module 718 is decremented at step 1110 by sending a signal over the mark decrement connection 732: $Mark[L_{out}]=Mark[L_{out}]-1$. This completes the fourth sub-process.

The value stored in a mark module 716, $Mark[L_{out}]$, indicates whether the corresponding output link $L_{out}$ is a root link (i.e., if the counter for that link is greater than 0) and also provides the number of subsequent packets transmitted on the link that are to be marked as packets generating congestion. Unless the output link becomes blocked, these packets will be marked as generating packets when they are transmitted. Note that it is possible for the second switch 700 to mark a different set of packets than those marked by the first switch 300 described above if the second switch 700 does not schedule packets in global FIFO (First In First Out) order. In such a situation, it is possible for packets that arrived at the second switch 700 after the Mark[ ] count was computed to be marked instead of packets that were queued at the second switch 700 at the time when the Mark[ ] count was determined. This behavior is actually desirable because it accelerates the generation of marked packets, allowing end nodes to react earlier to the congestion. Packets propagating congestion are marked in the same manner as they were in the first switch 300.

In the first switch 300 and the second switch 700, when the congestion detection processes identify packets that are contributing to congestion, these packets are marked to notify the end (i.e., source) nodes sending the packets so that they can control their data injection rate. However, it will be apparent that other actions such as selective dropping of packets are also possible. The congestion detection process is used in conjunction with congestion notification and congestion response processes to control network congestion. While the description herein includes terms such as marking (typically used in the prior art in reference to an FECN process), the different embodiments of the congestion detection process described herein are not limited to use with any particular congestion notification or congestion response process, but can be used in conjunction with any congestion notification process (including Forward Explicit Congestion Notification, in-band or out-of-band, and Backward Explicit Congestion Notification), any congestion response process (window control, rate control or their combination), as well as any method used to determine the congestion response (Additive Increase Multiplicative Decrease, etc.).

In the first switch 300 and the second switch 700 described above, a full input buffer condition is used as a trigger for detecting congestion spreading. However, congestion detection at a switch can alternatively be triggered when the number of packets (or bytes) enqueued at an input port exceeds a threshold. A switch that triggers congestion detection based on a threshold on the size of the input queue rather than a full buffer condition is likely to be advantageous in cases when the buffer sizes are reasonably large. The scan-based switch 300 and the count-based switch 700 described above can each be modified to trigger identification of propagating and generating packets when an input queue size exceeds the threshold size. The input queue size can be computed instantaneously, averaged over a sample interval, or averaged using an explicitly weighted moving average. The threshold can represent the number of packets or the quantity of data (e.g., the number of bytes) in a queue.

Trigger conditions based purely on the state of the input buffer (full buffer condition or a threshold on the input queue size) can lead to unfairness in certain cases. For example, consider a case in which a number of flows at a switch are destined for the same output port. If a disproportionate subset of these flows enter the switch through the same input port, this input port is likely to fill up (or exceed any threshold) more frequently than input ports used by other flows. As a result, if congestion detection is triggered solely by the input buffer state, congestion detection is likely to identify the flows sharing the input port as causing congestion more frequently than other flows destined for the same output port. A switch wherein congestion detection is triggered based on the state of the input buffer as well as on the number of packets (or bytes) enqueued at the switch and destined for any output port can counter this unfairness while still detecting input ports that are likely to be propagating congestion. Thus congestion detection at a switch can be alternatively triggered when an input buffer becomes full or when the number of packets (or bytes) in the switch destined for any output port exceeds a threshold.

The switches 300, 700 described above mark all propagating and generating packets at the time congestion spreading is detected. In situations where network round-trip latencies and the reaction times of the end node congestion response processes are sufficiently low, it may be possible to contain the congestion spreading quickly without marking all these packets. Higher network utilization and throughput may be achieved by marking only the generating packets. The congestion detection processes described above can be modified to skip the step of marking propagating packets. It should be noted that the choice of marking propagating and generating packets or marking only generating packets is independent of (and, hence, can be used in any combination with) whether a switch is scan-based (like switch 300) or count-based (like switch 700), and whether a congestion detection process is triggered by a buffer becoming full or reaching a threshold fullness.

The switches 300, 700 have input buffers and no output buffers. In switches with output buffering, all packets destined for a particular output link are queued at the buffer associated with that output link. Hence, if an output link is identified as the root of a congestion, the packets enqueued at that output port are the packets generating congestion. This eliminates the need to examine any other switch buffers to identify packets generating congestion. The congestion detection processes can be adapted for an output buffered switch as follows:

(i) The detection of congestion spreading at a switch is triggered when an output queue becomes full. The full queue indicates congestion spreading is occurring and packets in this queue are identified as packets propagating the congestion.

(ii) An output link at the switch is identified as the root of a congestion tree when its queue is full and the output link is not blocked (i.e., it has credits for sending data packets). If an output link identified as the root link runs out of credits and blocks at a later time, the decision is revoked and the output link is not considered a root link any longer.

(iii) All data packets enqueued at the output link at the instant the output link is identified as a root are identified as packets generating congestion. As above, if the output link runs out of credits at a future time, it ceases to be a root link and packets at its queue are no longer considered packets generating congestion. Note that these packets will, however, remain marked as propagating congestion.

The switches 300, 700 and their congestion detection processes are for use in networks with link level flow control, which do not drop packets. In networks where switches drop packets upon congestion, output links will never block. Downstream switches will always accept incoming packets (but may discard them subsequently if buffer space is insufficient). This has two implications. First, this prevents congestion from propagating to other switches. Second, in the absence of link blocking, it is necessary to distinguish congested links based on their level of link utilization.

The congestion detection processes described above can be adapted for use in networks that drop packets upon congestion as follows: (i) output links at a switch for which at least one packet in a full input queue (or, alternatively, an input queue with size larger than a predetermined threshold) is destined and whose utilization is greater than a threshold value are identified as congested links; and (ii) data packets queued at any of the switch's input buffers and destined for a congested link when an input queue becomes full (or when its size reaches or exceeds the predetermined size) are identified as packets generating congestion. These modifications can be made to the scan-based process where all input ports are scanned for packets destined to the congested links when congestion is detected, or the count-based process which uses a count of packets destined to each output link, as described above. Packet dropping policies such as those used in RED can be applied among the packets identified by the congestion detection processes as causing congestion.

The network switches and congestion detection processes described herein provide a number of advantages over prior art congestion detection processes. Prior art congestion detection processes are designed only for networks that allow switches to drop packets during congestion. In networks with link flow control that do not drop packets even when the network is congested, it is important to differentiate between flows that are causing congestion spreading from flows that are suffering congestion spreading. Congestion detection processes that differentiate between these types of flows are described above.

Congestion detection processes are described above for any buffer configuration. In particular, even when used in switches with input queues, these processes distinguish packets that are flowing through the congested output link from packets that are flowing through other output links. Additionally, in such switches, these processes identify all packets at the switch that are flowing through the congested link.

The congestion detection processes described above based on full queue determination may be easier to implement than prior art congestion detection processes. First, these congestion detection processes described above do not require average queue sizes to be determined. Second, most do not require setting threshold values, which are usually difficult to choose and calibrate for different traffic patterns, topologies, etc. Prior art processes, such as RED and DECbit, may require switches to compute average queue sizes, and use thresholds to trigger congestion detection. Finally, the congestion detection processes described above may not maintain per-connection state information, as required, for example, for explicit rate control techniques such as ATM congestion control processes, and therefore may be scalable to large networks.

Many modifications will be apparent to those skilled in the art without departing from the scope of the present invention as herein described with reference to the accompanying drawings.

What is claimed is:

1. A method for detecting congestion in a communications network, including:
   upon determining that a size of a first input queue of a network switch exceeds a predetermined value, identifying an output link of said network switch as a congested link on the basis of at least one packet in a first input queue of said network switch destined for said output link, wherein said output link is not blocked, and identifying said output link as not being a congested link when said output link becomes blocked;
   storing congestion state data including one of said identification of said output link as a congested link or said identification of said output link as not being a congested link; and
   identifying at least one packet in a second input queue of said network switch as a packet generating congestion if said at least one packet in the second queue is destined for said congested link.

2. A method as claimed in claim 1, wherein said step of identifying an output link includes identifying said output link as a congested link when the number of packets or bytes destined for said output link in queues of said network switch exceeds a predetermined value.

3. A method as claimed in claim 1, wherein said output link is identified as congested link when said at least one packet is in a full input queue of said network switch.

4. A method as claimed in claim 1, including marking a packet about to be transmitted on an output link as generating congestion if said packet is identified as generating congestion and said output link is identified as a congested link.

5. A method as claimed in claim 1, wherein said output link is identified as a congested link when the utilization of said output link has exceeded a predetermined value.

6. A method as claimed in claim 1, including marking packets in said input queue as propagating congestion when the size of said queue exceeds said predetermined value.

7. A network switch for use in a communications network, including
   queues for storing packets received on one or more ports of said network switch;
   one or more link state modules for storing link state data indicating states of links connected to said one or more ports; and
   a packet logic module connected to said queues and said one or more link state modules,
      said packet logic module responsive to when a size of a first input queue exceeds a predetermined value to:
      determine the destination port of each packet in the first input queue;
      store congestion state data in at least one of the one or more link state modules corresponding to said destination port, wherein the congestion state data stored in said link state module of said one or more ports indicates the output link of said one or more ports is congested if the output link is not blocked and indicates the output link of said one or more ports is not congested if the output link is blocked; and
      identify a packet in a second queue of said switch as a packet generating congestion if congestion state data stored in at least one of the one or more link state modules of the destination port of said packet has one of one or more predetermined states and the destination port is not blocked.

8. A network switch for use in a communications network, including:
   queues for storing packets received on one or more ports of said network switch;
   one or more link state modules for storing link state data indicating states of links connected to said one or more ports; and
   a packet logic module connected to said queues and said one or more link state modules,
      said packet logic module responsive to when a size of a first input queue exceeds a predetermined value to:
      determine the destination port of each packet in the first input queue;
      store congestion state data in at least one of the one or more link state modules corresponding to said destination port; and
      identify a packet in a second queue of said switch as a packet generating congestion if congestion state data stored in at least one of the one or more link state modules of the destination port of said packet has one of one or more predetermined states and the destination port is not blocked; and
   wherein said packet logic module identifies a packet in a queue of said network switch as a packet generating congestion if congestion state data stored in link state module of the destination port of said packet indicates the output link of said one or more ports is congested, and said network switch includes a module for marking a packet scheduled for transmission on an output link as generating congestion if said packet is identified as generating congestion and said output link is identified as a congested link.

9. A network switch as claimed in claim 8, wherein the link state module for at least one of said one or more ports stores congestion state data including a count of packets in said queues destined for the at least one of said one or more ports that are identified as generating congestion if the link for the at least one of said one or more ports has a first state, and zero if the link has a second state.

10. A network switch as claimed in claim 7, including a module for marking a packet scheduled for transmission on a destination port as generating congestion if the congestion state data stored for said destination port includes a non-zero count of packets as generating congestion.

11. A network switch as claimed in claim 9, wherein said packet logic module is adapted to mark packets in said queue as packets propagating congestion.

12. The method as claimed in claim 1, wherein the output link is either blocked or not blocked.

13. The method as claimed in claim 1, wherein the network switch is arranged to provide link level flow control of the at least one packet.

14. The network switch as claimed in claim 7, wherein the network switch is arranged to not drop packets.

\* \* \* \* \*